US007489596B2

(12) United States Patent
Kuczynski et al.

(10) Patent No.: US 7,489,596 B2
(45) Date of Patent: Feb. 10, 2009

(54) METHODS AND APPARATUS CAPABLE OF INDICATING ELAPSED TIME INTERVALS

(75) Inventors: Joseph Kuczynski, Rochester, MN (US); David Otto Lewis, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 282 days.

(21) Appl. No.: 11/225,676

(22) Filed: Sep. 13, 2005

(65) Prior Publication Data

US 2007/0058493 A1 Mar. 15, 2007

(51) Int. Cl.
*G04F 7/00* (2006.01)
*G01N 21/00* (2006.01)

(52) U.S. Cl. ..................... 368/114; 368/327; 250/474.1

(58) Field of Classification Search ......... 368/113–114, 368/327; 33/269; 250/474.1
See application file for complete search history.

(56) References Cited

U.S. PATENT DOCUMENTS 00,075 A * 6/1845 Gardner
3,582,656 A * 6/1971 Koehler ................. 250/370.01
4,276,633 A * 6/1981 Takami et al. ............... 368/227
4,903,254 A * 2/1990 Haas .......................... 368/327
5,490,194 A 2/1996 Komatsu et al.
5,500,529 A 3/1996 Tawil et al.
5,637,876 A * 6/1997 Donahue et al. ......... 250/474.1
5,656,815 A 8/1997 Justus et al.
5,797,344 A 8/1998 Ramsey et al.
6,198,701 B1 * 3/2001 De Jonghe et al. .......... 368/327
6,567,346 B2 * 5/2003 Aton et al. .................. 368/155
6,613,581 B1 9/2003 Wada et al.
6,707,042 B2 3/2004 Brand et al.
2004/0206917 A1 * 10/2004 Rourk ..................... 250/474.1

* cited by examiner

*Primary Examiner*—Vit Miska
*Assistant Examiner*—Sean Kayes
(74) *Attorney, Agent, or Firm*—Matthew C. Zehrer

(57) ABSTRACT

A method and apparatus of defining a time interval includes providing a source of ionizing radiation that radiates emissions thereof; placing a radiation sensitive display material responsive to ionizing radiation in a close proximity relationship to the source of ionizing radiation whereby the radiated emissions of the source strike the radiation sensitive display material, thereby commencing a time interval; and, measuring changes in characteristics of the radiation sensitive display material that are indicative of the elapsed time.

16 Claims, 8 Drawing Sheets

METHODS AND APPARATUS CAPABLE OF INDICATING ELAPSED TIME INTERVALS

BACKGROUND OF THE INVENTION

The present invention is directed to improved methods and apparatus capable of determining elapsed time intervals, and, in particular, to improved methods and apparatus enabling highly accurate determinations of elapsed time intervals that are clearly displayed without consuming power and may be used for warranty, maintenance, and other purposes.

Warranty verification is an extremely important aspect of modern commerce. In this regard, the ability to detect product substitution, tampering, theft, and other problems leading to violations of warranties is increasingly important. Furthermore, it is important for general maintenance of equipment, such as electronic equipment, to more easily know when a part or product is nearing a periodic maintenance term, whereby it is to be evaluated and possibly exchanged.

Many approaches exist for indicating elapsed time intervals for use with products. A significant number of approaches use electronic time measuring devices and/or electronic displays of elapsed time. For example, in the nuclear field, dosimeters are used with electronic timers to measure the amount of radiation over a period of time that might be indicative of dangerous radiation levels. Other efforts to measure time include utilizing color-changing materials. For example, there are known materials that change color, but are highly sensitive to thermal variations. Hence, they are not as reliable as might otherwise be desired for a variety of commercial and industrial applications. Therefore, continuing efforts are being undertaken in this field, especially in terms of improving the accuracy of elapsed time determinations in a non-power consuming manner that displays clearly the results of elapsed time, and is low-cost, safe, highly versatile, and reliable.

Without continued improvements in methods and apparatus enabling highly accurate determinations of elapsed time intervals in a non-power consuming manner whereby results of elapsed time are displayed clearly, and which is low-cost, safe, highly versatile, and reliable, the true potential of improved warranty verification and maintenance management for products and parts may not be fully achieved.

SUMMARY OF THE INVENTION

The present invention provides without negative effect and in a manner that overcomes disadvantages of the prior art, enhanced methods and apparatus enabling determinations of elapsed time intervals in a non-power consuming manner, whereby the results of elapsed time are displayed clearly, and in a low-cost, safe, highly versatile, and reliable manner.

One aspect of an illustrated embodiment is a method and apparatus enabling the definition of a time interval, comprising: providing a source of ionizing radiation having at least a first surface that radiates emissions thereof; placing a first surface of a radiation sensitive display material responsive to ionizing radiation in a close proximity relationship to the first surface of the source of ionizing radiation so that the radiated emissions of the source strike the radiation sensitive display material, whereby a time interval is commenced; and, measuring changes in characteristics of the radiation sensitive display material that are indicative of the elapsed time that the radiated emissions of the source strike and effect changes in the radiation sensitive display material after being placed in the close proximity relationship.

Another aspect of an illustrated embodiment is a method and apparatus defining a time interval, comprising: providing a source of radiation that radiates emissions; measuring a first reading at an initial time, of the radiation level of the radiated emissions; placing a radiation suppression element in overlying relationship to the source of radiation so that the radiated emissions are suppressed from passing through the radiation suppression element; removing the radiation suppression element from the overlying relationship; and, measuring a second reading at a later time, of the radiation level of the radiated emissions of the source of radiation, whereby differences in measured levels of radiation between the first and second readings are indicative of elapsed time between the first and second readings.

Yet another aspect of the present embodiments is providing a method and apparatus that yields a high degree of specificity and high reliability in terms of measuring time intervals and which is directly readable without consuming electric power.

Yet still another aspect of the present embodiments is providing a method and apparatus that is for use in determining time intervals that may be used for warranty purposes, etc, which is low-cost, safe, highly versatile, and reliable.

These and other features and aspects of the present embodiments will be more fully understood from the following detailed description of the preferred embodiments, which should be read in light of the accompanying drawings. It should be understood that both the foregoing generalized description and the following detailed description are exemplary, and are not restrictive of the invention.

DETAILED DESCRIPTION

Figure 1:
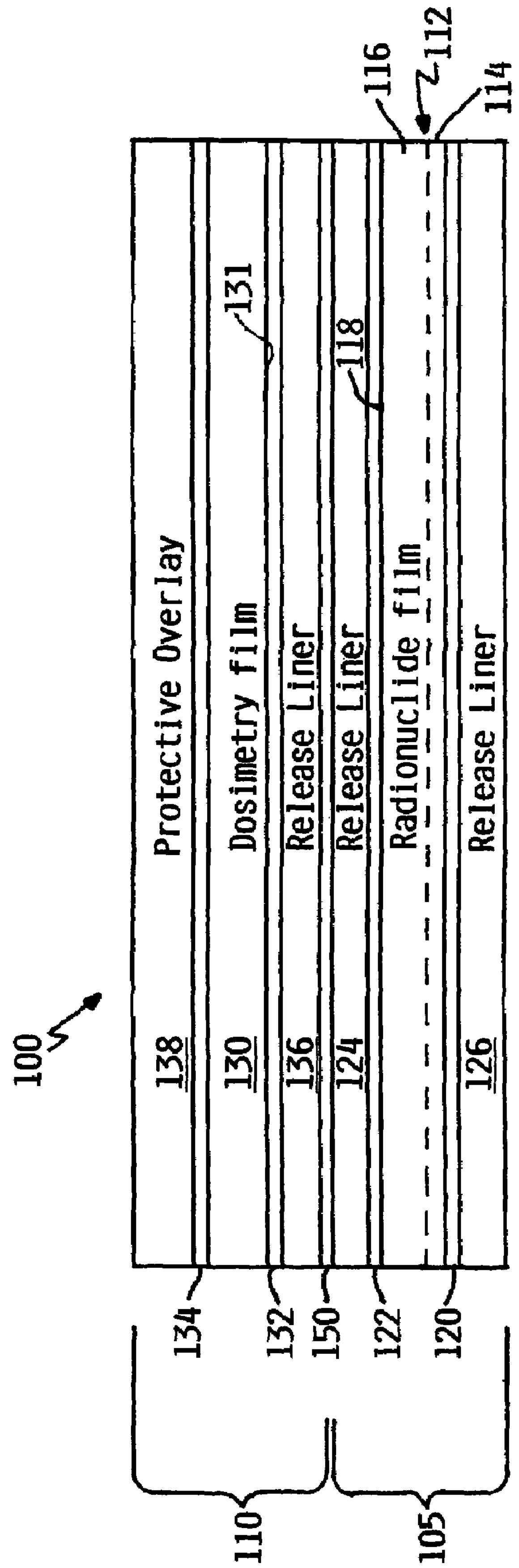
FIG. 1 is a schematic cross-sectional view of a dual-layered elapsed time interval indicator apparatus made according to the present invention prior to activation.

FIG. 1 depicts an exemplary embodiment of one multiple layer construction of an elapsed time interval indicator apparatus 100 made according to the present invention. The indicator apparatus 100 is adapted to be a peel-apart construction. In this regard, components thereof may comprise at least a first layer assembly 105 and a second layer assembly 110. The first layer assembly 105 and the second layer assembly 110 are in a juxtaposed overlying relationship to each other to form a dual layered construction. The first layer assembly 105 and the second layer assembly 110 can be coupled and decoupled to commence and terminate an elapsed time interval as will be described. While a dual-layer assembly construction is illustrated, several layer assemblies may be integrated as well.

In the exemplary embodiment, the indicator apparatus 100 is a label that is comprised of, preferably, a thin radiation emitting film 112 that is a source which emits essentially ionizing radiation. The thin ionizing radiation emitting film 112 may include a thin carrier foil layer 114 and a radiation emitting layer 116. In this embodiment, the carrier foil layer 114 is, preferably, made of a suitable metal, such as a nickel foil layer 114. The radiation emitting layer 116 may be a Ni-63 radionuclide film and may be applied by electroplating on one surface of the nickel foil layer 114 of the radiation emitting film 112. The thin nickel foil layer 114 may have a thickness on the order of about 0.5 mils and the radiation emitting layer 116 have a thickness on the order of about 10.0 mils. Other thicknesses may be used depending on the constituency of the radiation emitting layer 116 as well as the uses intended for the indicator apparatus. The radiation emitting layer 116 may be adapted to emit from a first surface 118, preferably, alpha and/or beta particles, although the present invention is not limited in scope to those specific particles. The radiation emitting layer 116 in this embodiment emits beta radiation having an energy in a range of about 5-75 keV, and, preferably, between about 17 to 66 keV. It will be appreciated that the scope of the invention embraces other radioactive strengths depending on the end uses envisioned. Emitted radioactive particles, such as alpha and beta particles, have a measurable and detectable half-life. One reason for utilizing alpha and/or beta particles is that they are generally of low strength and may be shielded relatively easily. In addition, alpha and/or beta particles at the radiation levels preferred do not otherwise pose a health radiation risk when used in the manner contemplated by this invention. The alpha and/or beta particles selected are capable of striking a radiation sensitive recording medium that is sensitive to ionizing radiation, such as a dosimetry film layer 130 and cause physical changes to the latter. Because commercial usage is contemplated, the radiation emitting film 112 contains a sufficient quantity of radioactive material that does not present any established health hazard risks, as determined by U.S. government agencies. The radiation emitting film 112 of this embodiment may be obtained commercially from several sources including Stuart Hunt and Associates, Toronto, Ontario, Canada, or Victoreen, Inc., Cleveland, Ohio, USA. The radiation emitting layer 116 is a formulation comprising a Ni-63 radionuclide layer (i.e., a nickel 63 isotope). Other suitable sources of ionizing radiation materials are contemplated, such as tritium, cesium 137, strontium 90, and americium 291. While the above embodiments disclose one type of radiation emitting film construction, the present invention contemplates a variety of radiation emitting materials. For instance, tritium is also a low-energy beta emitter that poses little health risk, but occurs primarily as tritiated water ($T_2$0). Successful use of tritium in the elapsed time apparatus requires replacement of the Ni-63 radionuclide layer with an aqueous dispersion of tritiated water in any suitable water-borne pressure sensitive adhesive.

A pair of pressure sensitive adhesive layers 120, 122 may be laminated to the opposing surfaces of the ionizing radiation emitting film 112 using conventional techniques and processes. The pressure sensitive adhesive layers 120, 122 may be made from any of a number of acrylic-based, rubber-based, or silicone-based double-sided adhesive transfer formulations, such as those available from 3M, St. Paul, Minn., USA or Adhesives Research, Glen Rock, Pa., USA. Clearly, other suitable materials may be utilized. The pressure sensitive adhesive layer 120 is utilized for purposes of minimizing or even eliminating penetration of the radioactive materials therethrough. Given the radiation strength being emitted by the radiation emitting film 112, the pressure sensitive adhesive layer 120 may have a thickness in the range of about 0.5-10 mils; preferably from about 1-2 mils. The pressure sensitive adhesive layer 122 has a relatively thinner thickness than the pressure sensitive adhesive layer 120. This is for permitting penetration of the beta particles into the radiation sensitive display or dosimetry film layer 130 when the two are mated in a juxtaposed overlying relationship during a period in which the radiation is to be measured (see FIG. 1). In this embodiment, the pressure sensitive adhesive layer 122 has a thickness on the order of about 0.5 mil or less. Clearly, the thickness ranges of the pressure sensitive adhesive layers may vary depending on the degree to which radiation is to be attenuated. If necessary, the pressure sensitive adhesive layer 122 may be die cut (not shown) into a picture frame geometry or perforated to allow direct exposure between the radiation emitting layer 116 and the radiation sensitive display or dosimetry film layer 130. Both the pressure sensitive adhesive layers 120, 122, may be made of a destructive type of adhesive material which has strength such that it will act to tear the facestock of the material that it is in contact with. One non-limiting example of such an adhesive is 350 High Strength acrylic adhesive which is manufactured by 3M, Minneapolis, Minn. Other destructive types of adhesive materials are contemplated. The strengths can, of course, vary depending on the uses contemplated. Tampering with the indicator is substantially reduced or even eliminated through the use of the pressure sensitive adhesive layers being of the destructive type.

A release liner 124 having a suitable thickness is laminated to the pressure sensitive adhesive layer 122 in order to prevent premature adhesion of the first layer assembly 105 during shipping and storage. The release liner 124 is made from any suitable material, such as Kraft paper, polyester film, or vinyl film. A release liner 126 having a suitable thickness is laminated to pressure sensitive adhesive layer 120 in order to prevent premature adhesion during shipping and storage. The release liner 126 may also be made from any suitable material, such as Kraft paper, polyester film, or vinyl film. The thicknesses of the release layers may be in a range of about 1-10 mils; preferably about 3 mils. The thickness ranges are preferred because they tend to minimize or eliminate any undesired radiation from leaking. The thickness ranges of the pressure sensitive adhesive layers may also be taken into account for shielding. As such, the first layered assembly 105 of the indicator apparatus 100 is formed.

The second layer assembly 110 in the present embodiment includes a radiation sensitive display or dosimetry film layer 130. The radiation sensitive display or dosimetry film layer 130 may be a known dosimetry film in which changes in physical and chemical characteristics thereof occur in response and proportional to the incident dosage of radioactive materials, such as the beta particles. The dosimetry film layer 130 may be of the black and white type that is commercially available from, for example, Agfa or Kodak. In this embodiment, the dosimetry film layer 130 may have pressure sensitive adhesive layers 132, 134 laminated to opposing surfaces thereof. The pressure sensitive adhesive layers 132, 134 have thickness of about 1 mils to 10 mils; respectively. Again, the thicknesses are for controlling the attenuation of radioactive materials without comprising pliability and the adhesive characteristics thereof. The dosimetry film layer 130 may be laminated to a release liner 136 through the pressure sensitive adhesive layer 132. The pressure sensitive adhesive layer 132 may be made of a destructive type of adhesive material, such that it will cause destruction of the dosimetry film if the latter is removed from being mated to the radiation emitting film. The pressure sensitive adhesive layer 132 can be made of material similar to that for the pressure sensitive adhesive layers 120, 122. The strength of the adhesive for the pressure sensitive adhesive layer 132 is appropriately selected towards functioning as noted. The thickness of the radiation sensitive dosimetry film layer 130 is such that all of the emitted beta particles are, preferably, absorbed therein. The beta particles strike a first surface 131 of the dosimetry film layer 130. In addition, the risk of incidental exposure is further controlled and limited. In this embodiment, dosimetry film layer 130 may have a thickness of about 10 mils. Other suitable kinds of radiation sensitive materials and thicknesses may be applied depending on the circumstances encountered. In practice, the beta particles emitted from the radiation emitting film 112 strike the dosimetry film layer 130 causing the latter to darken proportionally to the incident dose of the beta radiation. As time elapses, a greater number of beta particles strike the dosimetry film layer 130 thereby causing it to continue darkening. The embodiment illustrated in FIG. 2 and to be described depicts an indicator apparatus 200 wherein a highly sensitive, color-producing dosimetry film is used.

A protective element or overlay 138 essentially comprises an optically transparent film that is laminated to a top or second surface of the dosimetry film layer 130 (see FIG. 1) through the pressure sensitive adhesive layer 134. The protective overlay 138 is subsequently laminated on the surface of the dosimetry film layer 130 remote from the radiation emitting film 112. Just prior to use (e.g., directly before a part containing the indicator apparatus is shipped from the warehouse), the first and second assemblies are separated, the release liners discarded, and, then the first and second layer assemblies are mated. In this fashion, the "clock", i.e., exposure of the dosimetry film, will begin to record elapsed time as close to part delivery as possible.

The protective element or overlay 138 is optically transparent for allowing direct reading by users or any automated equipment for reading the results. The protective overlay 138 may be made from any of a number of polymeric materials, including but not limited to, polycarbonate, polyvinyl chloride, polyethylene, polyester, and polypropylene. The protective overlay 138 is transparent and/or translucent to visually reveal the changes to the optical properties of the dosimetry film layer 130 as the dosage of beta particles changes. The progressive darkening intensities of the dosimetry film layer 130 are indicative of elapsed time. Measurement of the progressive darkening may be accomplished in a number of known ways both manually and/or automatically.

Figure 5:
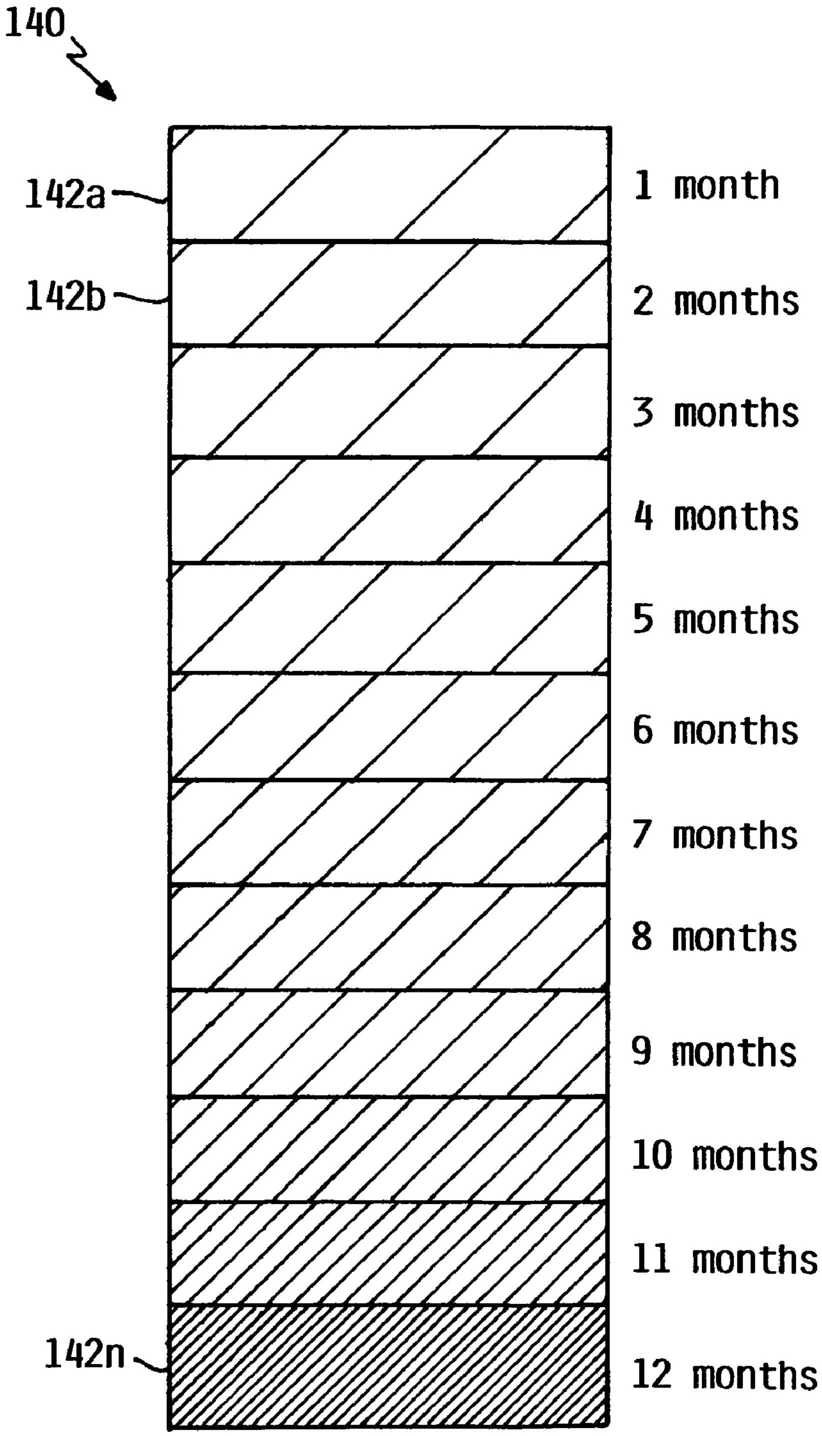
FIG. 5 is a schematic cross-sectional view of a grayscale device usable in conjunction with the present invention.

One exemplary approach utilizes a separate grayscale device 140 illustrated in FIG. 5. The grayscale device 140 correlates changes in the optical density of the film with known elapsed time intervals for the particular amount of radiation dosage for that kind of film. Specifically, the darker the intensity of the dosimetry film layer 130, the greater the elapsed time. The grayscale device 140 may have a plurality of distinct optical density bands 142*a-n* (collectively 142) whose densities are proportional to the absorbed dosage. A user may determine passage of time by comparing the optical density of the dosimetry film layer 130 at any point in time to the grayscale device 140. Known optical devices may also be used to visually compare the optical densities of the various optical density bands 142. The illustrated time intervals or periods for optical density bands 142 are indexed for periods, such as months, etc. The foregoing periods are for illustration purposes. Of course, the materials and dosage rates may be changed, whereby the variations in optical properties reflect progressively different periods. Such time intervals can be correlated to any particular period of interest, such as warranty, time management matters for products, etc. Accordingly, a direct reading of the elapsed time of an interval may be viewed without electric power in a highly reliable manner.

A low tack pressure sensitive adhesive layer 150 may be applied to either one or both of the first layer assembly 105 and the second layer assembly 110. The low tack pressure sensitive adhesive layer 150 may be applied to one or both release liners 124 and 126. In this embodiment, the pressure sensitive adhesive layer 150 is laminated on the release liner of the second layer assembly 110 by conventional techniques. As such, the second layer assembly 110 of the indicator apparatus 100 is formed. Towards this end, the low tack pressure sensitive adhesive layer 150 may be made from acrylic, silicone, and/or rubber based materials. The low tack pressure sensitive adhesive layer 150 may have a thickness in the range of 1-5 mils and should be sufficient to allow repeated peelings and laminations. The foregoing examples of materials for the low tack pressure sensitive adhesive layer 150 are non-limiting, insofar as a wide variety of materials may achieve the desired selective repeatable peel-apart aspects. The first and second layer assemblies 105, 110 are halves that may be joined together for shipping and/or mounting. The low tack pressure sensitive adhesive 150 provides for easy separation of the two halves of the indicator apparatus while the dual release liners, as noted, provide sufficient thickness to stop the beta particles from exposing the dosimetry film and otherwise halt undesired leakage of radiation.

Figure 7:
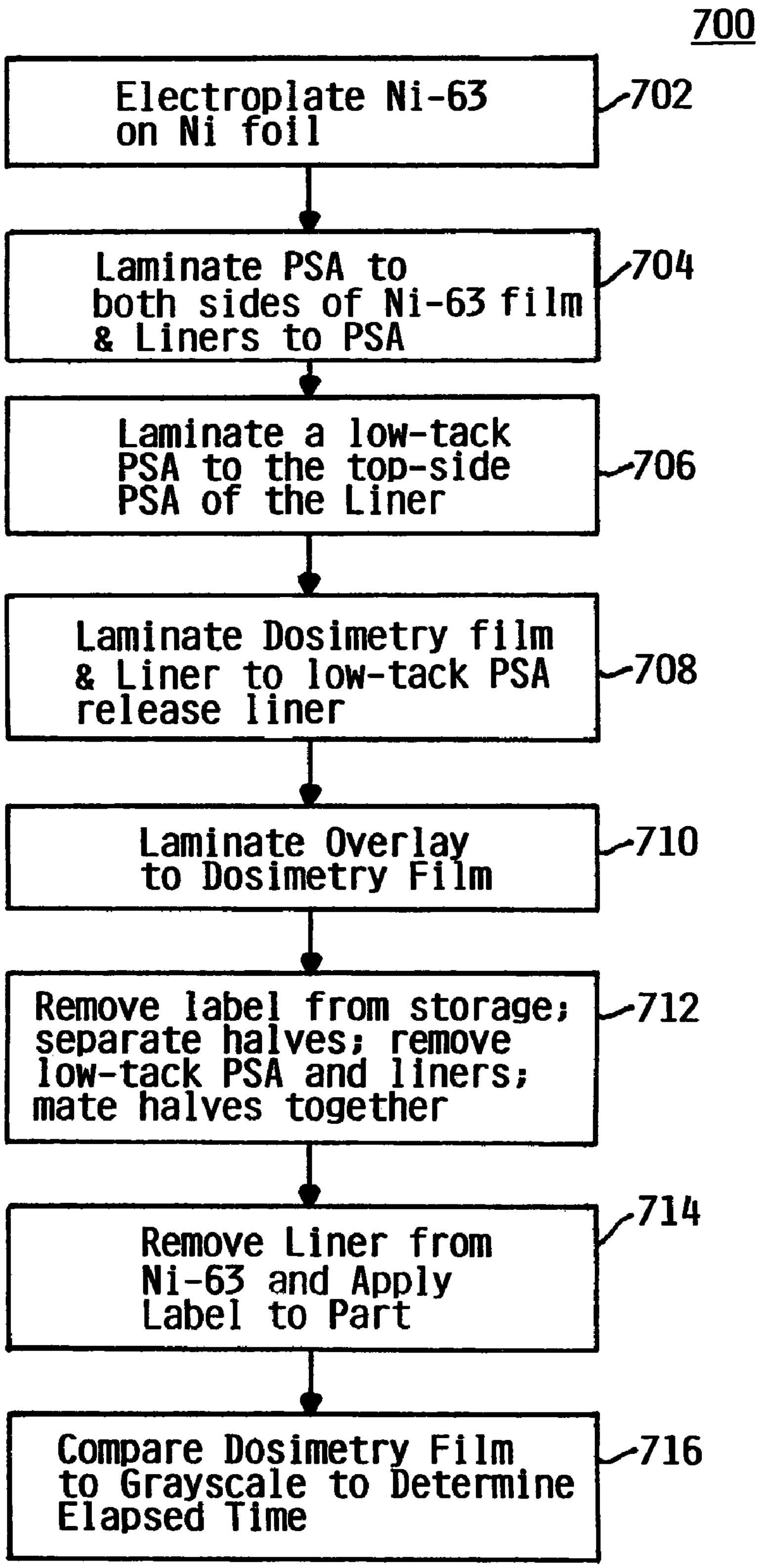
FIG. 7 is a flow chart of another exemplary process of the present invention.

FIG. 7 illustrates a process 700 for forming and using the indicator apparatus 100 depicted in FIG. 1. In STEP 702, the radiation emitting layer (e.g., Ni-63 radionuclide layer) 116 is electroplated on the nickel foil layer 114 using conventional techniques and processes. It will be appreciated that other radiation emitting layers may be used. Thereafter, in STEP 704, the pressure sensitive adhesive layers 120, 122 may be laminated to the opposing surfaces of the ionizing radiation emitting film 112 using conventional techniques and processes. In STEP 706, the release liners 124, 126 are laminated to both sides of the pressure sensitive adhesive layer 122 using conventional techniques and processes and the low tack pressure sensitive adhesive layer is laminated on top of the release liner 124. In STEP 708, the process includes laminating the dosimetry film layer 130 and the release liner 136 to the low tack pressure sensitive adhesive layer 150. In STEP 710, the protective overlay 138 is laminated to the dosimetry film layer 130 through the pressure sensitive adhesive layer 134. As such, the second layer assembly 110 is constructed. In STEP 712, the indicator apparatus 100 as depicted in FIG. 1, is removed from storage, the first and second assemblies 105, 110 are separated, the release liners 124, 136 are discarded along with the low tack pressure sensitive adhesive layer 150, and then the first and second layer assemblies are mated together. In this fashion, the "clock", i.e., exposure of the dosimetry film, will begin to record elapsed time (as close to part delivery as possible). In STEP 714, the release liner 126 is removed and the indicator apparatus 100 is applied to a part or product for which time of application is to be measured (e.g., beginning of a warranty period). It will be appreciated that the sequence of steps 712 and 714 may be changed as well as the group of procedures in each of the steps. In STEP 716, the optical changes to the dosimetry film are compared to the grayscale device 140 for purposes of determining the elapsed time. The changes in the optical properties may be viewed by a user through the protective overlay 138 and compared to the grayscale device 140 in a known manner to determine the amount of time the dosimetry film layer 130 was exposed to the beta particles. Hence, a user can determine the amount of time of exposure to the radiation for a variety of purposes including determining warranty purposes. Advantageously, a multi-layered construction tends to avoid premature darkening of the dosimetry film, such as may occur during storage.

Figure 2:
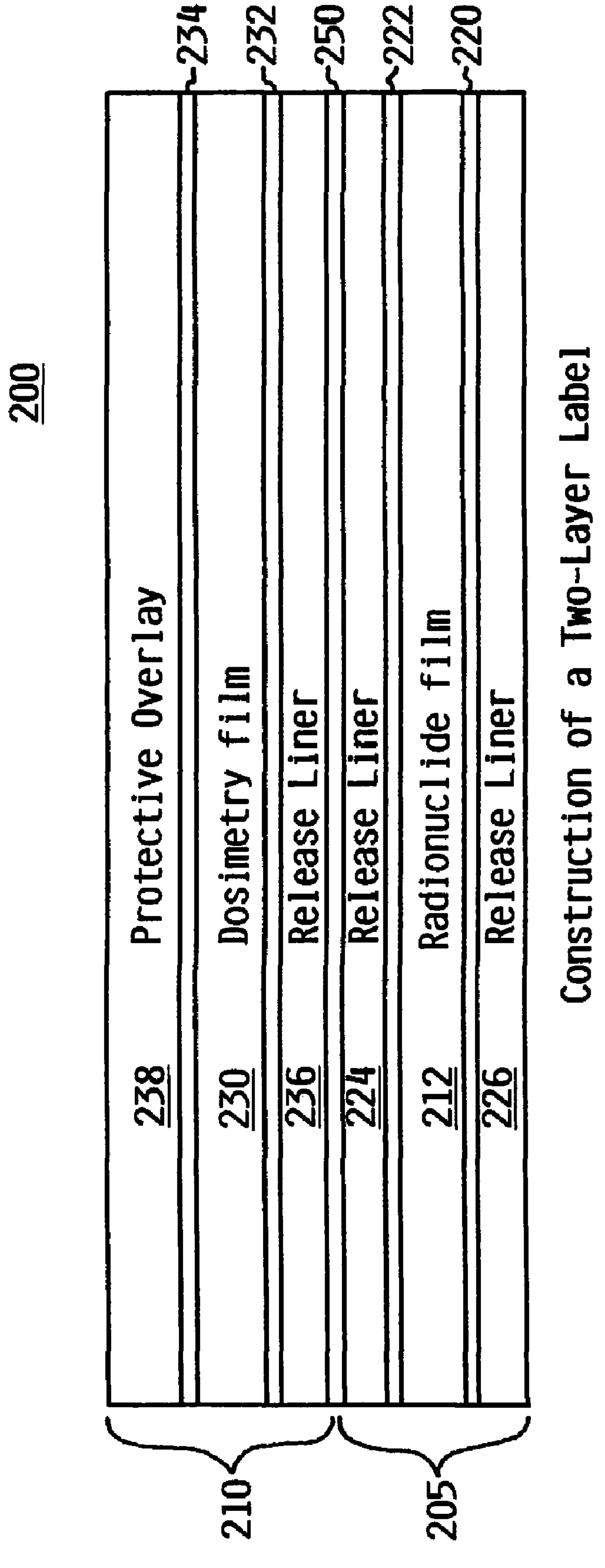
FIG. 2 is a schematic cross-sectional view of an elapsed time interval indicator apparatus of another exemplary embodiment.

FIG. 2 depicts an exemplary construction of an indicator apparatus 200. The structures of the present indicator apparatus 200 that are the same as the previous embodiment will be designated by the same reference numerals but with the substitution of the prefix 2 for the prefix 1. This construction differs from the previous one in that it substitutes a color-producing image recording medium 230 for the black and white dosimetry film layer 130. The color-producing image recording medium 230 may, in a preferred embodiment, be GAF Chromic® color producing film that is commercially available from ISP Corp. of Wayne, N.J., USA. A film such as the type noted above is selected for use in situations wherein energetic electrons can be used to measure sources of all types covering a wide range of radioactive energies down to 5 keV or in some instances lower. The active component (not shown) in the film is comprised of sub-micron sized crystals of a radiation sensitive monomer. When the film is exposed to ionizing radiation, a polymerization reaction is initiated resulting in the production of a blue-color dye-polymer complex. The quantity of the polymer produced and the intensity of color change is proportional to the dose absorbed in the active layer. As with the standard silver-halide dosimetry film, an optical property change is effected. Therefore, a blue-colored "grayscale" device (not shown) will measure the resultant optical property changes of this embodiment. The blue-colored grayscale device is used to correlate color intensity to elapsed time of exposure. It will also be pointed out that in all the exemplary embodiments, the color producing image-recording medium may be substituted for the black and white image recording media without departing from the scope of the present invention.

Figure 3:
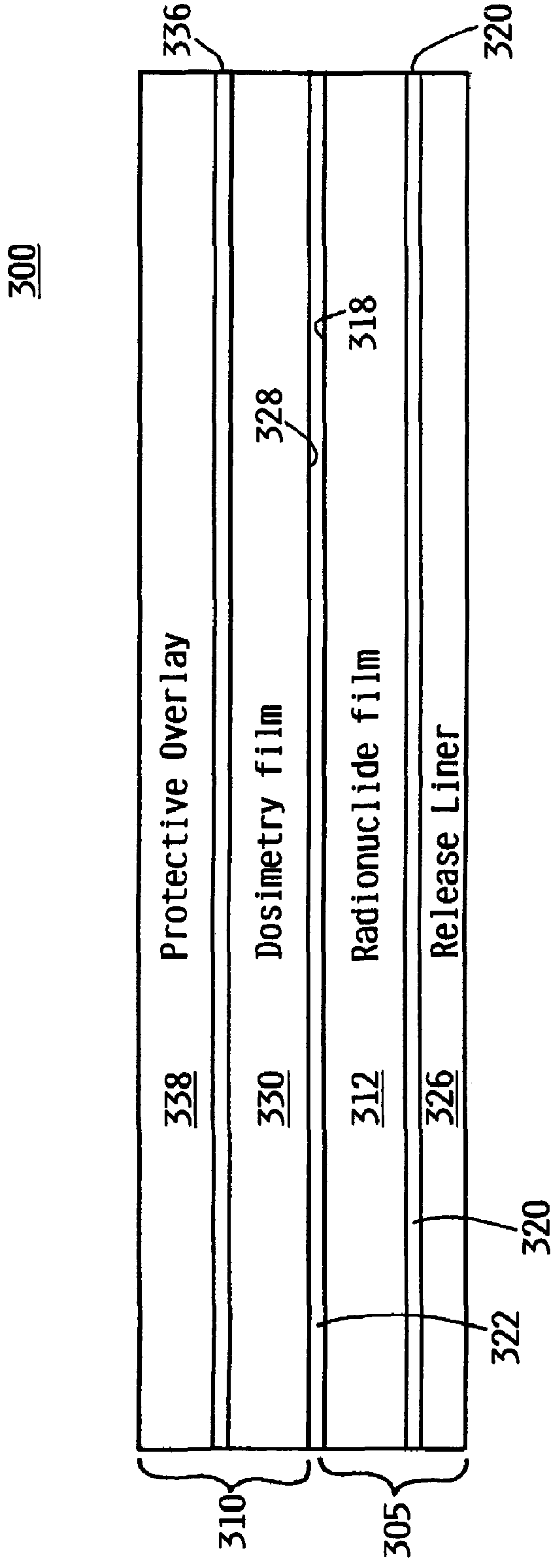
FIG. 3 is a schematic cross-sectional view of a simplified elapsed time interval indicator apparatus of yet another exemplary embodiment.

FIG. 3 depicts another exemplary and simplified construction of an indicator apparatus 300. The structures of the present indicator apparatus 300 that may be the same as the previous indicator apparatus 100 are designated by the same reference numerals, but with the substitution of the prefix "3" for the prefix "1". In this embodiment, there are not matable halves that are selectively laminated and delaminated repeatedly. Rather, the radiation emitting layer 312 is bonded on one side to the release liner 326, and bonded to the dosimetry layer 330 thru a pressure sensitive adhesive layer 322 on the other side to provide a unitary construction. The pressure sensitive adhesive layer 322 allows passage of the beta particles, whereby the latter strike the film for effecting changes in the optical properties of the film. These changes in the optical properties may be viewed thru a transparent protective overlay 338. The release liner 326 may be removed and the indicator apparatus attached to a part or product. The thin and flexible nature of the indicator apparatus provides great versatility in enabling the indicator apparatus 300 to be applied to a variety of surfaces.

Figure 6:
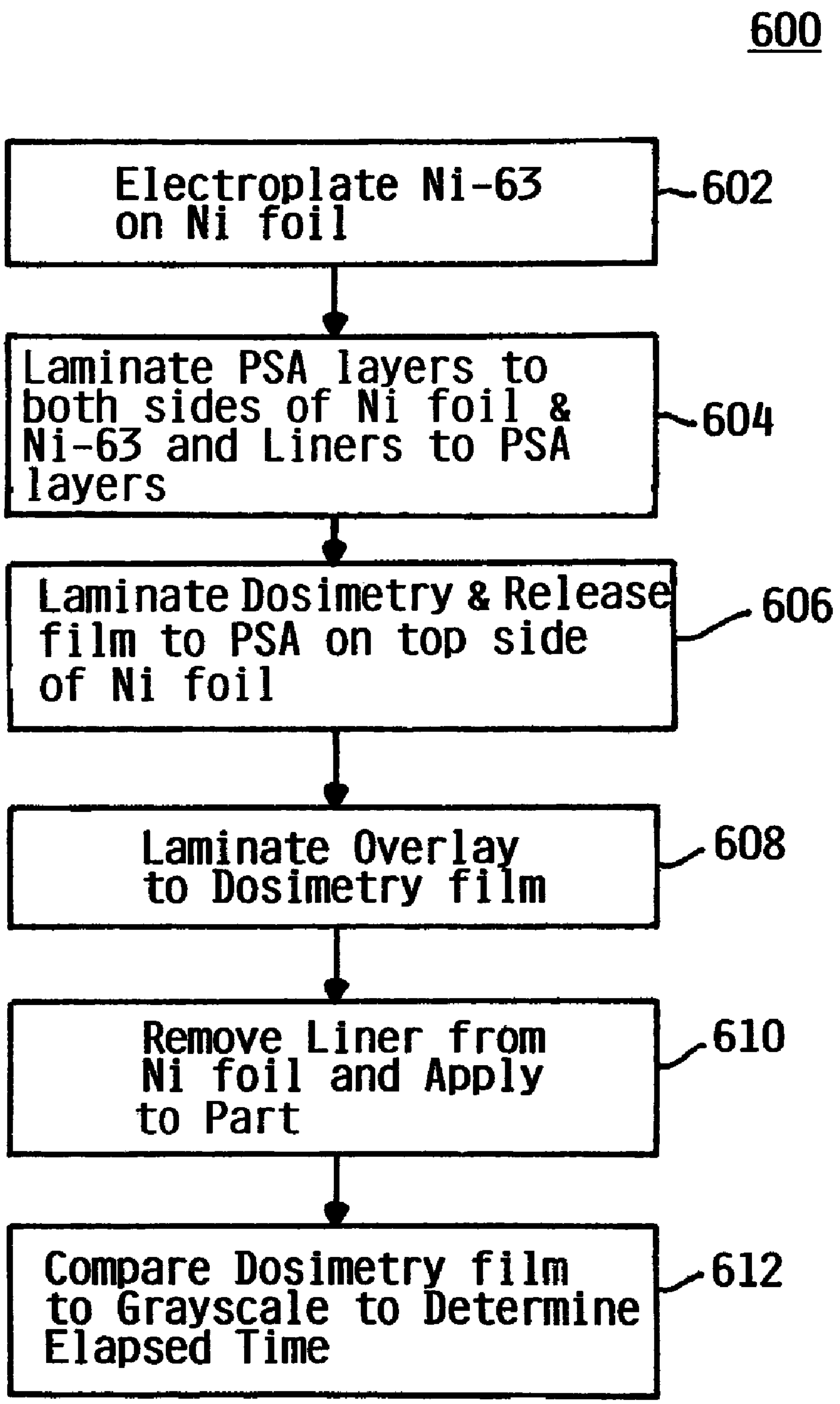
FIG. 6 is a flow chart of one exemplary process of the present invention.

Reference is made to FIG. 6 for illustrating one process 600 in making and using the indicator apparatus 300. In STEP 602, the radiation emitting film 312 is electroplated on the nickel foil layer using conventional techniques and processes. Thereafter, in STEP 604, the pressure sensitive adhesive layers 320, 322 may be laminated to the opposing surfaces of the ionizing radiation emitting film 312 using conventional techniques and processes. In STEP 606, the process 600 includes laminating the dosimetry film 330 to the pressure sensitive adhesive layer 322. In STEP 608, the protective layer 338 is laminated to the dosimetry film 330 through the pressure sensitive adhesive layer 334. As such, the indicator apparatus 300 is constructed. In STEP 610, the release liner 326, as depicted in FIG. 3, is removed and the pressure sensitive adhesive layer 320 is applied to a part or product (not shown). The radiation emitting film 312 has a first surface 318 then imparts the beta radiation to a first surface 331 of the dosimetry film 330 for commencing an exposure interval. In STEP 612, the changes in the visual output of the dosimetry film 330 may be directly read by a user after consulting with the grayscale device 140.

Figure 4:
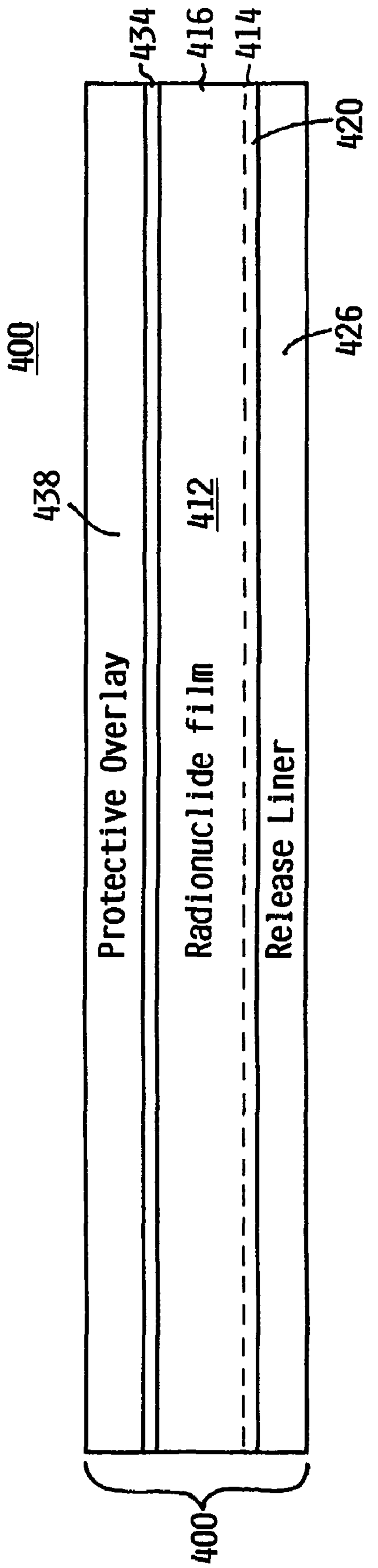
FIG. 4 is a schematic cross-sectional view of an elapsed time interval indicator apparatus during activation.

FIG. 4 depicts another exemplary and simplified construction of an indicator apparatus 400. The structures of the present indicator apparatus 400 that may be the same as the previous indicator apparatus 100 are designated by the same reference numerals, but with the substitution of the prefix "4" for the prefix "1". An exemplary construction of indicator apparatus 400 differs from the others in that it is non peel-apart, and a radiation sensitive recording medium may be absent. The exemplary embodiment relies upon the protective overlay that is releasably coupled to the ionizing radiation emitting film layer 412 and selectively allows measuring emitted radiation. By measuring the differences in radiation strength, one can determine the elapsed time between the radiation measuring events. This is because the decay rate of the radiation is known and elapsed time may be computed in a known fashion. Hence, there is a high degree of specificity and high reliability in terms of measuring time intervals. This is highly advantageous for use in measuring warranty periods and is a distinct improvement over other known procedures for the same purposes.

Figure 8:
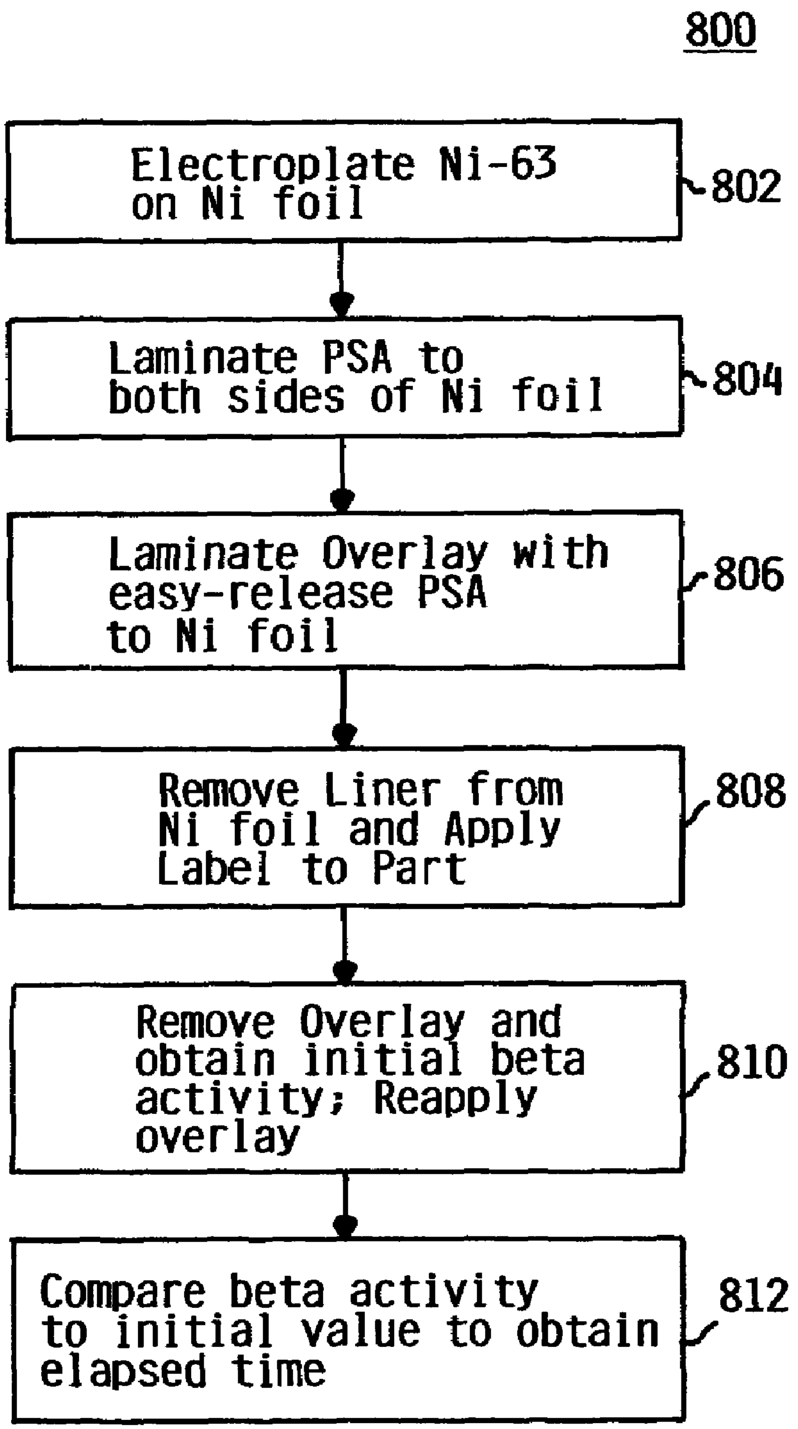
FIG. 8 is a flow chart of another exemplary process of the present invention.

One exemplary process 800 of assembling and using the indicator apparatus 400 is set forth in FIG. 8. The fabrication of the radiation emitting film 412 is performed in STEP 802, wherein the radiation emitting layer 416 is electroplated on the nickel foil layer 414. In STEP 804, pressure sensitive adhesive layers are laminated to both sides of the radiation emitting film. In STEP 806, the protective overlay 438 is laminated with an easy-release pressure sensitive layer 434 to a beta-emitting surface of the radiation emitting film 412. In STEP 806, the release liner 426 on the bottom of the indicator apparatus 400 is removed. The indicator apparatus 400 is applied to, for example, a part to be shipped. In order to obtain elapsed time information, the protective overlay 438 is removed and the beta activity is recorded in STEP 810 for a first time reading. In this regard, a radiation counter is utilized, such as a hand-held Geiger counter, such as the GAMMA_SCOUT® commercially available from, Eurami Group, USA. Of course, the protective overlay 438 is relaminated to the radiation emitting film 412. The protective overlay 438 serves as a radiation suppression element. Accordingly, the emission of beta activity is suppressed or shielded. Thereafter, at STEP 812 the protective overlay 438 is removed after a variable period of time has elapsed and a second reading of the beta activity is commenced. This recording is compared to the previous or first reading for purposes of facilitating a determination of the elapsed time based on the radiation reading. As noted, since the half-life of a radiation emitting layer 416 (Ni-63) is well documented, residual radioactive activity measured at any instance in time may be correlated to elapsed time.

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teachings without departing from the spirit and scope of the following claims.

What is claimed is:

1. A method of defining a time interval, comprising:

providing a source of ionizing radiation having at least a first surface that radiates emissions thereof;

placing a first surface of a radiation sensitive display material responsive to ionizing radiation in a close proximity relationship to the first surface of the source of ionizing radiation so that the radiated emissions of the source strike the radiation sensitive display material, whereby a time interval is commenced;

measuring the optical darkness density of the radiation sensitive display material that are indicative of the elapsed time that the radiated emissions of the source strike and effect changes in the radiation sensitive display material after being placed in the close proximity relationship thereto, wherein the optical darkness density of the radiation sensitive display increases progressively with the elapsed time; and, comparing the optical darkness density of the radiation sensitive display to a known optical darkness density to determine a time interval.

2. The method of claim 1 wherein the placing includes releasably adhesively joining the first surface of the radiation sensitive display material in overlying relationship to the first surface of the source of ionizing radiation.

3. The method of claim 1 further including placing a protective element in overlying relationship to a second surface of the radiation sensitive display material, the second surface of the radiation sensitive display material being in opposition to the first surface of the radiation sensitive display material such that the protective element protects the radiation sensitive display material and suppresses the radiated emissions.

4. The method of claim 1 wherein the providing of the radiation sensitive display material includes providing a dosimetry film sensitive to the radiated emissions.

5. The method of claim 1 wherein the providing the source of ionizing radiation includes providing a source that emits alpha and/or beta particles which are adapted to strike the radiation sensitive display material.

6. The method of claim 5 further including providing an adhesive layer on a second surface of the source of ionizing radiation that opposes the first surface of the source of ionizing radiation for allowing the source of ionizing radiation to be attached to a surface of an object.

7. The method of claim 6 further includes placing a release liner over the second surface of the source of ionizing radiation.

8. The method of claim 1 wherein the placing includes adhesively joining the first surface of the radiation sensitive display material in overlying relationship to the first surface of the source of ionizing radiation, wherein the adhesive joining includes adhesive that has strength which will act destructively to one or both of the radiation sensitive display material and/or the source of ionizing radiation.

9. A time measuring apparatus comprising:

a first assembly having a first surface with a source of radiation that radiates emissions of ionizing radiation;

a second assembly having a first surface that includes a radiation sensitive display material that darkens progressively with the amount of time the radiation sensitive display material is subject to ionizing radiation, the first surface of the first assembly being positionable in overlying juxtaposed relationship to a first surface of the second assembly so that the radiated emissions of the source strike and effect optical darkness changes in the radiation sensitive display material wherein the optical darkness changes are indicative of elapsed time that the radiated emissions of the source of radiation strike and effect changes in the darkness of the radiation sensitive display material; and, a correlating device for comparing the optical darkness of the radiation sensitive display material to a known optical darkness to determine the elapsed time.

10. The time measuring apparatus of claim 9 wherein the source of radiation is a radionuclide film.

11. The time measuring apparatus of claim 9 wherein the radiation sensitive display material is a dosimetry film.

12. The time measuring apparatus of claim 9 wherein the source of radiation emits alpha and/or beta particles.

13. The time measuring apparatus of claim 9 further comprising a protective element in overlying relationship to a second surface of the radiation sensitive display material responsive to ionizing radiation, the protective element protects the radiation sensitive display material and suppresses the radiated emissions.

14. The time measuring apparatus of claim 9 wherein a release liner is attached to the first surface of the first assembly, and a release liner is attached to the first surface of the second assembly.

15. The time measuring apparatus of claim 14 wherein at least one of the first and second release liners include an adhesive layer that enables the first and second release liners to be removably joined together.

16. The time measuring apparatus of claim 15 wherein the adhesive layer is a low tack pressure sensitive adhesive layer.

* * * * *